UNITED STATES PATENT OFFICE.

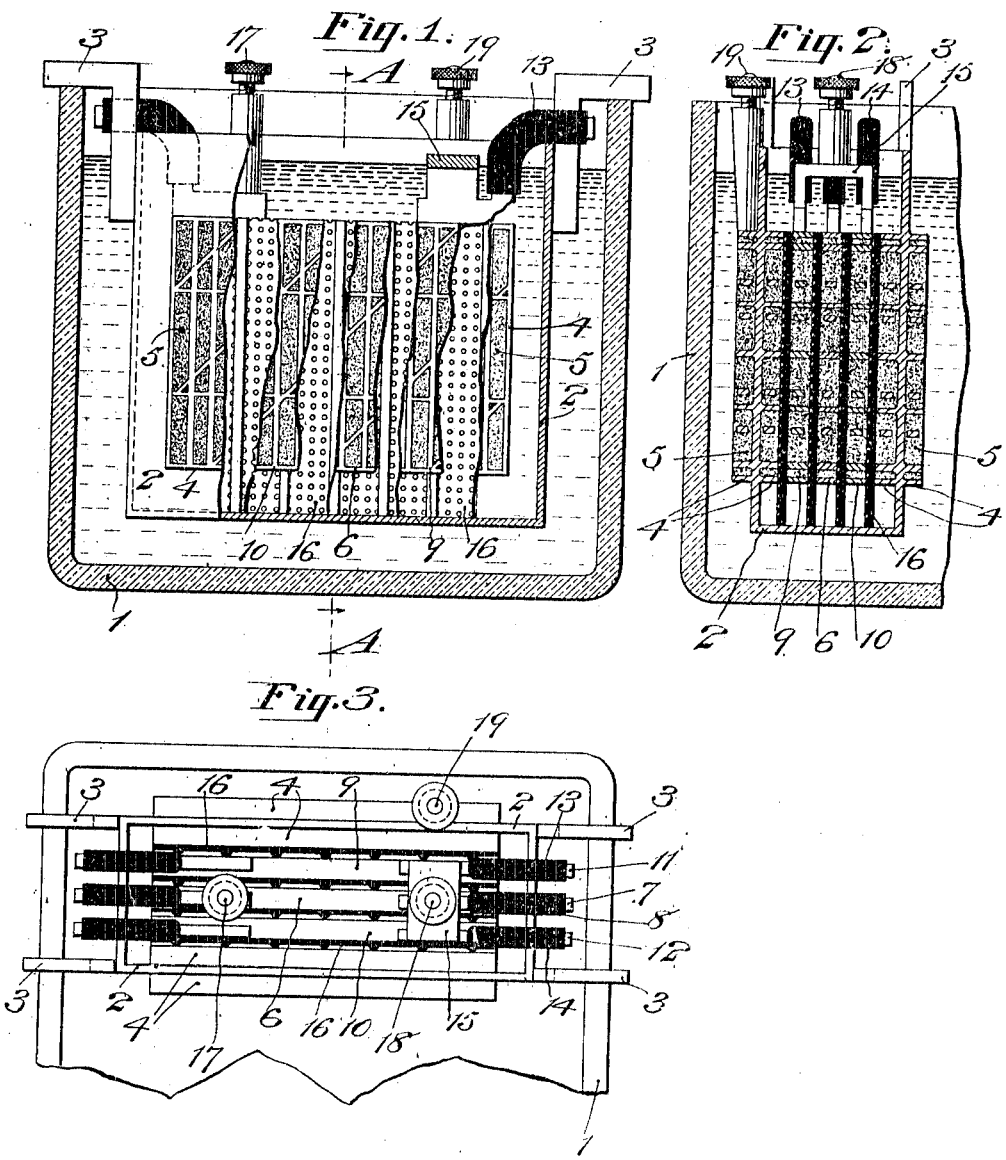

RUDOLPHE DRAMBOURG, OF NEW YORK, N. Y.

STORAGE-BATTERY PLATE.

1,105,499.   Specification of Letters Patent.   Patented July 28, 1914.

Application filed July 19, 1913. Serial No. 780,005.

*To all whom it may concern:*

Be it known that I, RUDOLPHE DRAMBOURG, a citizen of the United States, and resident of the borough of Brooklyn, in the city and State of New York, have invented a new and useful Improvement in Storage-Battery Plates, of which the following is a specification.

This invention relates to storage battery units of the general nature referred to in my copending application Serial No. 774,656, filed June 19, 1913, with the object in view of increasing the efficiency thereof.

Another object is to provide certain improvements in the form, construction and arrangement of the several parts whereby the above-mentioned object may be effectively carried out and the unit and its various parts may be conveniently handled in assembling them and disassembling them in a cell.

A practical embodiment of my invention is represented in the accompanying drawings, in which—

Figure 1 represents a section through a cell, with one of the units in position therein, portions being broken away to show underlying parts, Fig. 2 represents a section taken in the plane of the line A—A of Fig. 1, looking in the direction of the arrows, and Fig. 3 represents a top plan view of the parts shown in Fig. 2.

A suitable cell is denoted by 1 and it may be composed of glass or other desirable material and may be of conventional shape.

The unit comprises a casing 2 composed of some suitable lead-like material, and I prefer that it shall consist of a composition comprising antimony, iron pyrite (fool's gold) with the mica removed from it, and lead; these ingredients being preferably compounded in the proportions of five per cent. of antimony, ten per cent. of iron pyrite with the mica removed and eighty-five per cent. of lead. And when I say "iron pyrite" in the claims, I mean iron pyrite with the mica removed.

The casing 2 may be oblong in horizontal section or of any other convenient form or shape, and I preferably make it open at the top and provide its ends with brackets 3 adapted to rest upon the upper edges of the cell 1, for supporting the unit within the said cell separated from the bottom thereof, as clearly shown in Fig. 1. It will be understood that the casing 2 is liquid tight in order to hold the electrolyte as indicated in the drawings.

The side walls of the casing 2 are laterally projected, both inwardly and outwardly, in the form of a grid 4, this grid-like structure being composed of the same material as the remainder of the casing and conveniently comprising vertical, horizontal, and diagonal ribs, as clearly shown in Fig. 1. The vertical and horizontal ribs are so spaced as to form oblong interstices, and their edges are flush with each other. The diagonal ribs engage the other ribs, but are not flush with them and are not in contact with the side walls of the casing. The interstices of these grids are provided with a filling 5 to make them of a slab-like nature, this filling being composed of oxid of red lead, litharge, powdered charcoal, bone-ash, graphite, pulverized sulfur and oxid of magnesium, mixed with sulfuric acid and glycerin and compressed into the grid in paste like form; after which it hardens, leaving the face of the grid substantially flush. The addition of these grids to the inner and outer side walls of the casing 2, greatly increases the amperage of the plate, much more so than would the addition of slabs composed of the same material as the remainder of the casing.

Within the casing 2, I place three grids, of substantially the same form and of the same composition as the grids already described which are secured to the inner and outer side walls of the casing. The center one of these grids 6 is provided with a pair of bracket arms 7, very similar to the bracket arms 3 heretofore referred to, which bracket arms 7 are adapted to engage the upper edges of the casing 2 and hence support the grid 6 therein at a distance from the bottom of said casing. These bracket arms 7 are covered with insulating material 8, such as rubber, in order to keep the grid 6 out of electrical contact with the casing 2.

Grids 9 and 10, of the same size and substantially the same composition as the grid 6, are located, one on each side of the latter, and are similarly suspended within the casing 2 by bracket arms 11, 12, which are also covered with insulating material 13, 14, similar to the insulating material 8 on the bracket arms 7. These grids 9 and 10 are connected by a bridge 15 which may be composed of any suitable material but preferably of the same material as the grids. The grid 6 is separated from the grids 9 and 10, and the latter two grids are separated from the grids on the inner side walls of the casing 2, by sheets of insulating material 16, which may conveniently be composed of corrugated hard rubber.

The grid 6 may be provided with a suitable terminal 17 and the grids 9, 10, with a suitable terminal 18 mounted on the bridge 15. The casing 2 may also be provided with a suitable terminal 19. This unit as a whole is of such a structure as to generate both a positive and negative current within itself, and hence certain of the grids therein will be positive in character and others negative in character.

When a battery cell is so arranged as to number of units and connections that the grid 6 is positive, then the grids 9 and 10 will be negative, the grids on the inside of the walls of the casing 2 will be positive and the grids on the outside of the walls of the casing 2 will be negative. This difference in polarity between the grids on the inside and outside of the casing is due to the fact that they are in separate electrolytes.

For the purpose of indicating clearly the course of the current in a cell, I will assume a construction in which an ordinary cell contains two of the hollow units and six of the so-called booster plates, or ordinary plates which are located in cells commonly for the purpose of increasing the amperage thereof. Assuming such a construction, the terminal 18 will be the positive discharge terminal of the cell. This terminal rests upon the grids 9, 10, and the current will pass from them to the grid 6, through the electrolyte, making the grid 6 negative. The terminal 17 on the grid 6 will be connected with the terminal 19 on one of the outside grids 4 and a wire from this terminal 19 will be placed in contact with three of the six booster plates taken in alternation. The other three booster plates will be connected by wire to a terminal on the other unit corresponding to the terminal 19, and this terminal will, in turn, be connected to a terminal corresponding to the terminal 17. Then the terminal in the other unit which corresponds to the terminal 17 in the unit shown, will be the other main pole of the cell and will be negative.

I preferably make a slight difference in the filling material used in the plates, which are of positive and negative character, by slightly changing the proportions of the ingredients oxid of red lead and litharge. For the filling material to be used in the plates of a positve character I preferably combine the ingredients above specified in the proportions of three pounds oxid of red lead, two pounds litharge, ten ounces powdered charcoal, four ounces bone-ash, four ounces graphite, one ounce pulverized sulfur and four ounces oxid of magnesium, formed into a paste by admixture with chemically pure sulfuric acid and glycerin in equal parts, and pressed while in pasty condition into the grids.

For the filling to be used in the plates of a negative character, I proceed in exactly the same manner, except that I change the proportion of oxid of red lead to two pounds and the proportion of litharge to three pounds.

By the structure of unit above described, I am enabled to obtain a very high voltage from a single battery cell, and furthermore, by constructing the casing with plates on its inner and outer walls, and particularly by constructing these plates and the other plates within the casing of a grid like form, and further with the particular material specified, I am enabled to obtain a unit and hence a battery or a cell, of an extremely high amperage efficiency.

I have used the words "plate" and "grid" somewhat interchangeably in the foregoing description, but when I say "plate" in the claims it is intended to include both a grid proper and other structures of plates.

I desire to be understood that various changes may be made in the form, construction, composition and arrangement of the several parts without departing from the spirit and scope of my invention and hence do not wish to be limited to the specific features of the form herein shown and described except as they may be detailed in the claims.

What I claim is:—

1. A storage battery comprising an outer cell, a hollow unit within said cell fitted to hold electrolyte, a plurality of plates of different polarity supported within said unit, and plates secured to the inner and outer walls of said unit.

2. A storage battery comprising an outer cell, a hollow unit within said cell fitted to hold electrolyte, three plates, two of one polarity and one of another polarity supported within said unit, and plates secured to the inner and outer walls of said unit.

3. A storage battery comprising an outer cell, a hollow unit within said cell fitted to hold electrolyte, an odd number of plates supported within said unit, the majority of said plates being of one polarity and the minority of another polarity, and plates secured to the inner and outer walls of said unit.

4. In a storage battery plate, a grid slab comprising a grid composed of lead like material and a filling composed of oxid of red lead, litharge, charcoal, bone-ash, graphite, sulfur, oxid of magnesium, sulfuric acid and glycerin.

5. In a storage battery plate, a grid slab comprising a grid composed of antimony, iron pyrite, and lead; and a filling composed of oxid of red lead, litharge, charcoal, bone-ash, graphite, sulfur, oxid of magnesium, sulfuric acid and glycerin.

In testimony, that I claim the foregoing as my invention, I have signed my name in presence of two witnesses, this eighteenth day of July 1913.

RUDOLPHE DRAMBOURG.

Witnesses:
E. O. BENT,
F. GEORGE BARRY.